US009313222B2

(12) United States Patent
Huang et al.

(10) Patent No.: US 9,313,222 B2
(45) Date of Patent: Apr. 12, 2016

(54) METHOD, ELECTRONIC DEVICE, AND USER INTERFACE FOR ON-DEMAND DETECTING MALWARE

(71) Applicant: INSTITUTE FOR INFORMATION INDUSTRY, Taipei (TW)

(72) Inventors: Pei-Wen Huang, Taipei (TW); Hsiang-An Wen, New Taipei (TW); Ching-Hao Mao, Taipei (TW); Yu-Te Chen, Taipei (TW); Pei Te Chen, Kaohsiung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 41 days.

(21) Appl. No.: 14/317,100

(22) Filed: Jun. 27, 2014

(65) Prior Publication Data

US 2015/0319187 A1 Nov. 5, 2015

(30) Foreign Application Priority Data

Apr. 30, 2014 (TW) ............................. 103115530 A

(51) Int. Cl.
*H04L 29/06* (2006.01)
*G06F 3/0481* (2013.01)
*G06F 3/0484* (2013.01)
*G06F 3/0488* (2013.01)

(52) U.S. Cl.
CPC .......... *H04L 63/1433* (2013.01); *G06F 3/0481* (2013.01); *G06F 3/0488* (2013.01); *G06F 3/04842* (2013.01)

(58) Field of Classification Search
CPC .......................... G06F 3/0488; H04L 63/1433
See application file for complete search history.

(56) References Cited

U.S. PATENT DOCUMENTS

| 7,315,903 B1 * | 1/2008 | Bowden ............ H04L 41/00886 709/224 |
| 7,430,670 B1 * | 9/2008 | Horning .................. G06F 21/14 713/190 |
| 7,496,960 B1 | 2/2009 | Chen et al. |
| 8,713,684 B2 | 4/2014 | Bettini et al. |

(Continued)

FOREIGN PATENT DOCUMENTS

CN          102999419 A          3/2013

OTHER PUBLICATIONS

Nariman Mirzaei, et al., "Testing Android Apps Through Symbolic Execution", Dissertation, George Mason University.

*Primary Examiner* — Hadi Armouche
*Assistant Examiner* — Ali Shayanfar
(74) *Attorney, Agent, or Firm* — Li & Cai Intellectual Property (USA) Office

(57) ABSTRACT

A method, an electronic device, and a user interface for on-demand detecting a malware are provided and adapted for estimating whether an application has vulnerabilities or malicious behaviors. The method includes the following steps. Firstly, evaluating a risk level and a test time of the application which has vulnerabilities or malicious behaviors. Next, detecting the application by selection of user to estimate the risk level of the application which has vulnerabilities or malicious behaviors and then correspondingly generating a detection result. Therefore, the method, the electronic device, and the user interface for on-demand detecting the malware can detect the risk level of the application which has vulnerabilities or malicious behaviors before getting virus pattern of the variant or new malware.

18 Claims, 7 Drawing Sheets

(56) References Cited

U.S. PATENT DOCUMENTS

| | | | | |
|---|---|---|---|---|
| 8,806,641 B1* | 8/2014 | Li | G06F 21/564 | 717/174 |
| 8,856,774 B1* | 10/2014 | Kulaga | G06F 8/65 | 717/168 |
| 2002/0016918 A1* | 2/2002 | Tucker | G06F 21/14 | 713/190 |
| 2002/0065946 A1* | 5/2002 | Narayan | G06F 9/548 | 719/315 |
| 2012/0117647 A1* | 5/2012 | Chen | G06F 21/568 | 726/23 |
| 2012/0159628 A1* | 6/2012 | Dai | G06F 21/552 | 726/24 |
| 2012/0180124 A1* | 7/2012 | Dallas | G06F 21/46 | 726/22 |
| 2012/0260344 A1* | 10/2012 | Maor | C07K 14/775 | 726/25 |
| 2013/0097706 A1* | 4/2013 | Titonis | G06F 21/56 | 726/24 |
| 2013/0268675 A1* | 10/2013 | Tsai | H04L 61/1511 | 709/226 |
| 2014/0020096 A1* | 1/2014 | Khan | G06F 21/52 | 726/22 |
| 2014/0059690 A1* | 2/2014 | Li | G06F 21/577 | 726/25 |
| 2014/0082729 A1* | 3/2014 | Shim | G06F 21/51 | 726/23 |
| 2014/0130161 A1* | 5/2014 | Golovanov | G06F 21/564 | 726/23 |
| 2014/0180980 A1* | 6/2014 | Hido | G06N 99/005 | 706/12 |
| 2014/0181973 A1* | 6/2014 | Lee | G06F 21/562 | 726/23 |

* cited by examiner

METHOD, ELECTRONIC DEVICE, AND USER INTERFACE FOR ON-DEMAND DETECTING MALWARE

BACKGROUND

1. Technical Field

The present disclosure relates to a method, an electronic device, and a user interface for detecting a malware, in particular, to a method, an electronic device, and a user interface for on-demand detecting a malware.

2. Description of Related Art

With rapid advance and development of the electronic technology, the network becomes as a necessary part in the life. However, the network also may endanger the information security. The most serious danger is caused by the malwares which attack electronic devices of user. At present, the main malwares includes a spyware, a Trojan horse program and parasitic viruses. These malwares can be installed in the electronic devices of the unwitting users, and it is hard for the electronic device to sense the malwares which are executing tasks.

Traditional antivirus system extracts a virus pattern corresponding to the known malware and stores the virus pattern in a database. When the antivirus system receives an application, the antivirus system detects whether the application has the known virus pattern. The antivirus system isolates or deletes the malware after detecting the known virus pattern. However, the malware evolves to the variant malware or generates a new malware extremely fast, so the traditional antivirus system does not have enough capability to detect the variant or new malware.

Therefore, when said variant or new malware appears, it may damage the electronic device of the end user before the traditional antivirus system gets said virus pattern of said variant or new malware.

SUMMARY

An exemplary embodiment of the present disclosure provides a method for on-demand detecting a malware to estimate whether an application has vulnerabilities or malicious behaviors. The method for on-demand detecting the malware comprises the following steps of: receiving an application; next, decompiling the application, to generate a compiled code related to the application; creating multiple compilation paths according to the compiled code and an association analysis, wherein the compilation paths correspond to multiple instruction paths of application respectively; next, predicting a risk level and a test time of each of the compilation paths which has vulnerabilities or malicious behaviors, and classifying the compilation paths as multiple test items correspondingly; receiving a detection command to select at least one of the test items and a detectable time; selecting the corresponding compilation paths according to selection of the test items and the detectable time, to execute the instruction paths corresponding to the selected compilation paths, to generate a detection result indicating whether the application has the vulnerabilities or the malicious behaviors.

An exemplary embodiment of the present disclosure provides an electronic device for on-demand detecting a malware to estimate whether an application has vulnerabilities or malicious behaviors. The electronic device for on-demand detecting the malware comprises a display unit, a storage unit and a computing processing unit. The display unit is configured for displaying a detection interface. The storage unit is configured for storing the application. The computing processing unit is configured for executing steps of: receiving the application by operating the detection interface; decompiling the application, to generate a compiled code related to the application; creating multiple compilation paths according to the compiled code and an association analysis, wherein the compilation paths correspond to multiple instruction paths of application, respectively; predicting a risk level and a test time of each of the compilation paths which has vulnerabilities or malicious behaviors, and classifying the compilation paths as multiple test items correspondingly; receiving a detection command by operating the detection interface, to select at least one of the test items and a detectable time; selecting the corresponding compilation paths according to selection of the test items and the detectable time, to execute the instruction paths corresponding to the selected compilation paths, to generate a detection result indicating whether the application has the vulnerabilities or the malicious behaviors.

An exemplary embodiment of the present disclosure provides a user interface installed in an electronic device. The electronic device has a touch-sensitive display for displaying the user interface, a storage unit and a computing processing unit. The computing processing unit is configured for executing the application to be detected which is stored in the storage unit, to estimate whether the application has vulnerabilities or malicious behaviors. The user interface comprises a detection interface. The detection interface is configured for displaying multiple programs to be detected, and providing a user selecting an application to be detected. When the user selects the application to be detected, the detection interface displays at least one of the test items and a detectable time corresponding to the application, to provide the user selecting the test item of the risk and the detectable time for estimating whether the application has the vulnerabilities or the malicious behaviors. When the user selects the test item of the risk and the detectable time for the application, the detection interface displays a detection result indicating whether the application has the vulnerabilities or the malicious behaviors.

An exemplary embodiment of the present disclosure further provides a non-transitory computer-readable recording medium which records a computer executable program when the non-transitory computer-readable recording medium is accessed by a processor. The processor executes the steps of the method for on-demand detecting a malware.

To sum up, the exemplary embodiments of the present disclosure provide a method, an electronic device, and a user interface for on-demand detecting the malware, to estimate whether an application has vulnerabilities or malicious behaviors according to a risk level of instruction paths having the vulnerabilities or the malicious behaviors executed by the application. Therefore, the method, the electronic device, and the user interface provided in exemplary embodiments of the present disclosure can estimate whether the application has the vulnerabilities or the malicious behaviors without a virus pattern of the malware. Therefore, before getting the virus pattern of the variant or new malware, the method, the electronic device and the user interface provided in the exemplary embodiments of the present disclosure can detect the risk level of the received application which has the vulnerabilities or the malicious behaviors.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
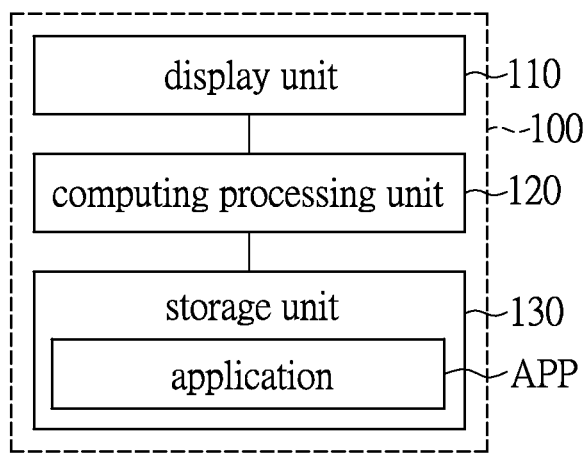
FIG. 1 is a schematic view of an electronic device for on-demand detecting a malware according to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

A method, an electronic device and a user interface provided in exemplary embodiments of the present disclosure predict a risk level and a test time of the received application which has vulnerabilities or malicious behaviors in advance, and then detects the application by a selection of user to estimate whether the selected application has vulnerabilities or malicious behaviors and then correspondingly generates a test report. Therefore, the method, the electronic device, and the user interface provided in exemplary embodiments of the present disclosure can estimate whether the application has vulnerabilities or malicious behaviors without a virus pattern of the malware. Compared with the traditional antivirus system, the method, the electronic device and the user interface for on-demand detecting the malware can detect the risk level of the received application which has vulnerabilities or malicious behaviors before getting the virus pattern of the variant or new malware. The method, the electronic device, and the user interface provided in the exemplary embodiment of the present disclosure will be described in the following paragraph.

Firstly, please refer to FIG. 1 which is a schematic view of the electronic device for on-demand detecting the malware according to an exemplary embodiment of the present disclosure. As shown in FIG. 1, an electronic device 100 for on-demand detecting the malware is configured for estimating whether an application APP received by the electronic device 100 has vulnerabilities or malicious behaviors, so as to prevent importance data in the electronic device 100 from being broken or stolen. In this exemplary embodiment, the electronic device 100 may be a smart phone, a desktop computer, a laptop computer or other electronic device capable of receiving or executing the application APP.

The electronic device 100 comprises a display unit 110, a computing processing unit 120 and a storage unit 130. The display unit 110 is configured for displaying a detection interface, such as a detection interface 160 shown in FIG. 5A, to further provide user controlling the detection interface. The display unit 110 may be a LCD screen having touch control input function or without touch control input function, but the present disclosure is not limited thereto.

The storage unit 130 is configured for storing the application APP to be detected. That is, after receiving the application APP to be detected, for example, the user selects the application to be detected through the detection interface, and the electronic device 100 stores the application APP in the storage unit 130. The related way of storing the application APP to the storage unit 130 by the electronic device 100 is a known storing manner, and the persons of ordinary skill in this technology field should know the way that the electronic device 100 stores the application APP to the storage unit 130, so the detail description is omitted. In this exemplary embodiment, the storage unit 130 may be a volatile memory IC or a non-volatile memory IC, such as a flash memory IC, a read-only memory IC, or a dram IC. Preferably, the storage unit 130 is the non-volatile memory IC.

The computing processing unit 120 is the main computing center of the electronic device 100, and is configured for executing analysis, computation and control. In this exemplary embodiment, the computing processing unit 120 may be a process IC, such as a CPU, a micro controller or an embedded controller. The computing processing unit 120 is electrically connected to the display unit 110 and the storage unit 130, and executes the following steps to estimate whether the application APP stored in the storage unit 130 has the vulnerabilities or the malicious behaviors.

Figure 2:
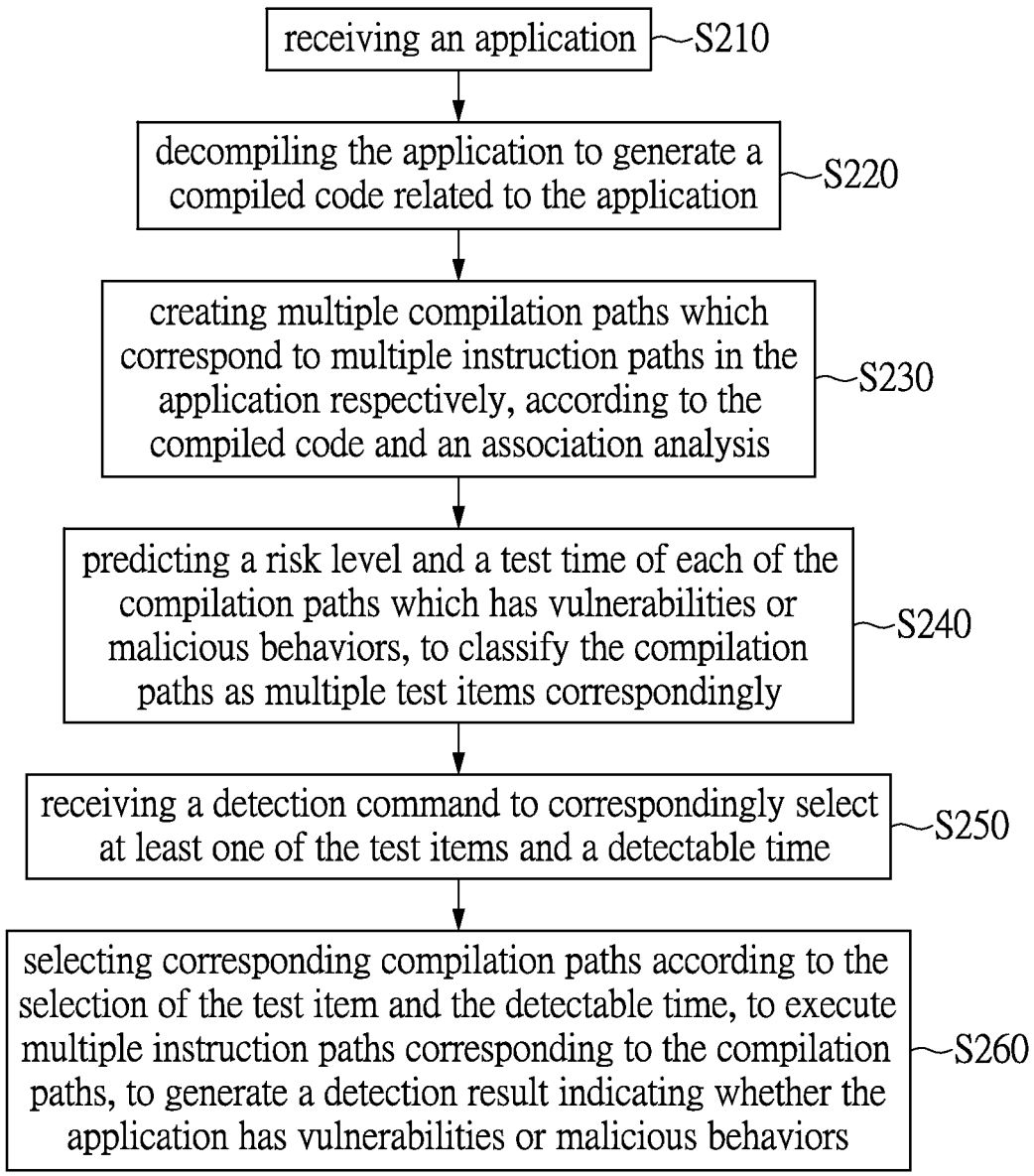
FIG. 2 is a flow diagram of a method for on-demand detecting a malware according to an exemplary embodiment of the present disclosure.

Please refer to FIG. 2. Firstly, in step S210, the computing processing unit 120 receives the application APP stored in the storage unit 130. Next, in step 220, the computing processing unit 120 decompiles the application APP to generate a compiled code associated with the application APP. In this exemplary embodiment, the compiled code is a byte-code, a smali code or other compiled code related to the application APP, but the present disclosure is not limited thereto.

It is noted that the compiled code is compiled by distributed coding in which function elements of the compiled code are not associated with each other. Therefore, the computing processing unit 120 utilizes an association analysis to find the association between the function elements of the compiled code, and creates multiple compilation paths correspondingly. The persons of ordinary skill in this technology field should know the implement and application for the association analysis, so the detail description is omitted. The compilation paths correspond to multiple instruction paths in the application APP respectively, and the instruction paths in the application APP indicate the paths to be executed by the application APP. In conclusion, in step 230, the computing processing unit 120 generates the compilation paths by decompiling the application APP and the association analysis, to predict the paths to be executed by the application APP.

In step S240, the computing processing unit 120 further predicts a risk level and a test time of each of the compilation paths which has vulnerabilities or malicious behaviors, to classify the compilation paths as multiple test items correspondingly. In this exemplary embodiment, the risk level and the test time of each compilation path can be predicted according to Open Web Application Security Project, NIST security guideline, or their combination, or can be defined by the user, and the present disclosure is not limited thereto. For example, as shown in table 1, there are six compilation paths PT1~PT6. The compilation path PT1, PT3 and PT5 are predicted as high risk level by the computing processing unit 120, and their test time are twenty, five, and ten minutes respectively. The compilation path PT2, PT4 and PT6 are predicted as low risk level by the computing processing unit 120, and their test time are ten, fifteen, and five minutes respectively. In this case, the computing processing unit 120 classifies the compilation path PT1~PT6 as two test items, that is, a "High" test item and a "Low" test item. The test items can be defined according to the practical condition of the compilation paths PT1~PT6. For example, the test items can be classified as a "Vulnerabilities" test item such as network risk or personal data risk, and a "Malicious behaviors" test item such as the changer system or the virus transmission, but the present disclosure is not limited thereto.

TABLE 1

| compilation path | PT1 | PT2 | PT3 | PT4 | PT5 | PT6 |
|---|---|---|---|---|---|---|
| risk level (High/Low) | High | Low | High | Low | High | Low |
| test time (minute) | 20 | 10 | 5 | 15 | 10 | 5 |

Next, in step 250, the computing processing unit 120 receives a detection command to correspondingly select at least one of the test items and a detectable time. In this exemplary embodiment, the detection command is generated by controlling the detection interface of the display unit 110, that is, the user controls the detection interface of the display unit 110 by touch control manner, to enable the detection interface generating the detection command to the computing processing unit 120. The detection command can also be generated by other control device, such as a keyboard electrically connected to the computing processing unit 120, but the present disclosure is not limited thereto. Next, in step S260, the computing processing unit 120 selects the corresponding compilation paths according to the selection of the test item and the detectable time. The computing processing unit 120 further executes instruction paths of the application APP corresponding to the compilation paths. After executing for the detectable time, the computing processing unit 120 generates a detection result indicating whether the application APP has vulnerabilities or malicious behaviors, to further notify the user a probability that the application APP is a malware.

Following the above example, when the detection command received by the computing processing unit 120 is the "High" test item and 25 minutes of the detectable time, the computing processing unit 120 further executes the instruction paths of the application APP corresponding to the compilation paths PT1, PT3 and PT5. The highest test time for the computing processing unit 120 to predict that of the compilation paths PT1, PT3 and PT5 is twenty minutes, that is, the computing processing unit 120 executes the "High" test item, so that the test time for completely estimating whether the application APP has vulnerabilities or malicious behaviors needs twenty minutes. Therefore, after executing for twenty minutes, the computing processing unit 120 generates a detection result indicating whether the application APP has vulnerabilities or malicious behaviors. The computing processing unit 120 does not execute for 25 minutes to generate the detection result indicating whether the application APP has vulnerabilities or malicious behaviors. The detection result is displayed on the detection interface of the display unit 110. In this case, the user can further handle the application APP according to the detection result, for example, the user can delete the application APP or open the application APP.

Alternatively, when the detection command received by the computing processing unit 120 is the "Low" test item and ten minutes of the detectable time, the computing processing unit 120 further executes the instruction paths of the application APP corresponding to the compilation paths PT2, PT4 and PT6. The highest test time for the computing processing unit 120 to predict that of the compilation paths PT2, PT4 and PT6 is fifteen minutes, that is, the computing processing unit 120 executes the "Low" test item, so that the test time for completely estimating whether the application APP has vulnerabilities or malicious behaviors needs fifteen minutes. However, the detectable time is just ten minutes. Therefore, after executing for ten minutes, the computing processing unit 120 generates the detection result indicating whether the application APP has vulnerabilities or the malicious behaviors, according to the completely executed instructions paths that include the instruction paths corresponding to the compilation path PT2 and PT6, and not completely executed instruction path that includes the instruction path corresponding to the compilation path PT4. The computing processing unit 120 does not execute for fifteen minutes to generate the detection result indicating whether the application APP has the vulnerabilities or the malicious behaviors. The detection result is displayed on the detection interface of the display unit 110. In this case, the user can further handle the application APP according to the detection result, for example, the user can delete the application APP or open the application APP.

Figure 3:
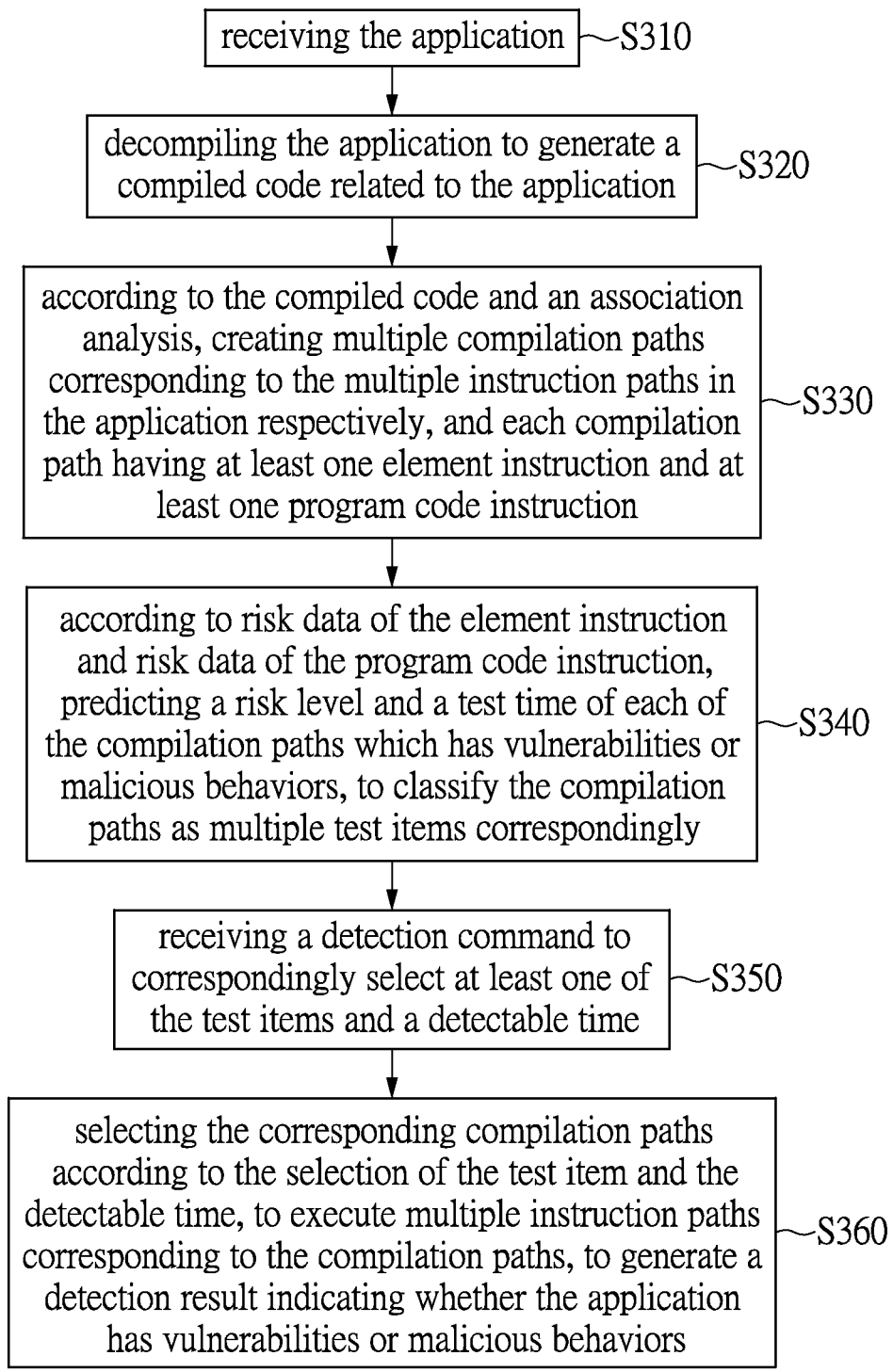
FIG. 3 is a flow diagram of a method for on-demand detecting a malware according to another exemplary embodiment of the present disclosure.

Next, please refer to FIG. 3 which is a flow diagram of the method for on-demand detecting the malware according to another exemplary embodiment of the present disclosure. Firstly, in step S310, the computing processing unit 120 receives the application APP stored in the storage unit 130. Next, in step 320, the computing processing unit 120 decompiles the application APP to generate a compiled code related to the application APP. In step 330, the computing processing unit 120 utilizes an association analysis to find the association between the function elements of the compiled code, and creates the multiple compilation paths correspondingly. The compilation paths correspond to the multiple instruction paths in the application APP respectively, and these instruction paths in the application APP indicate the paths to be executed by the application APP. The steps S310~S330 of the FIG. 3 are similar to the steps S210~230 of the FIG. 2, so their detail descriptions are omitted.

Figure 4:
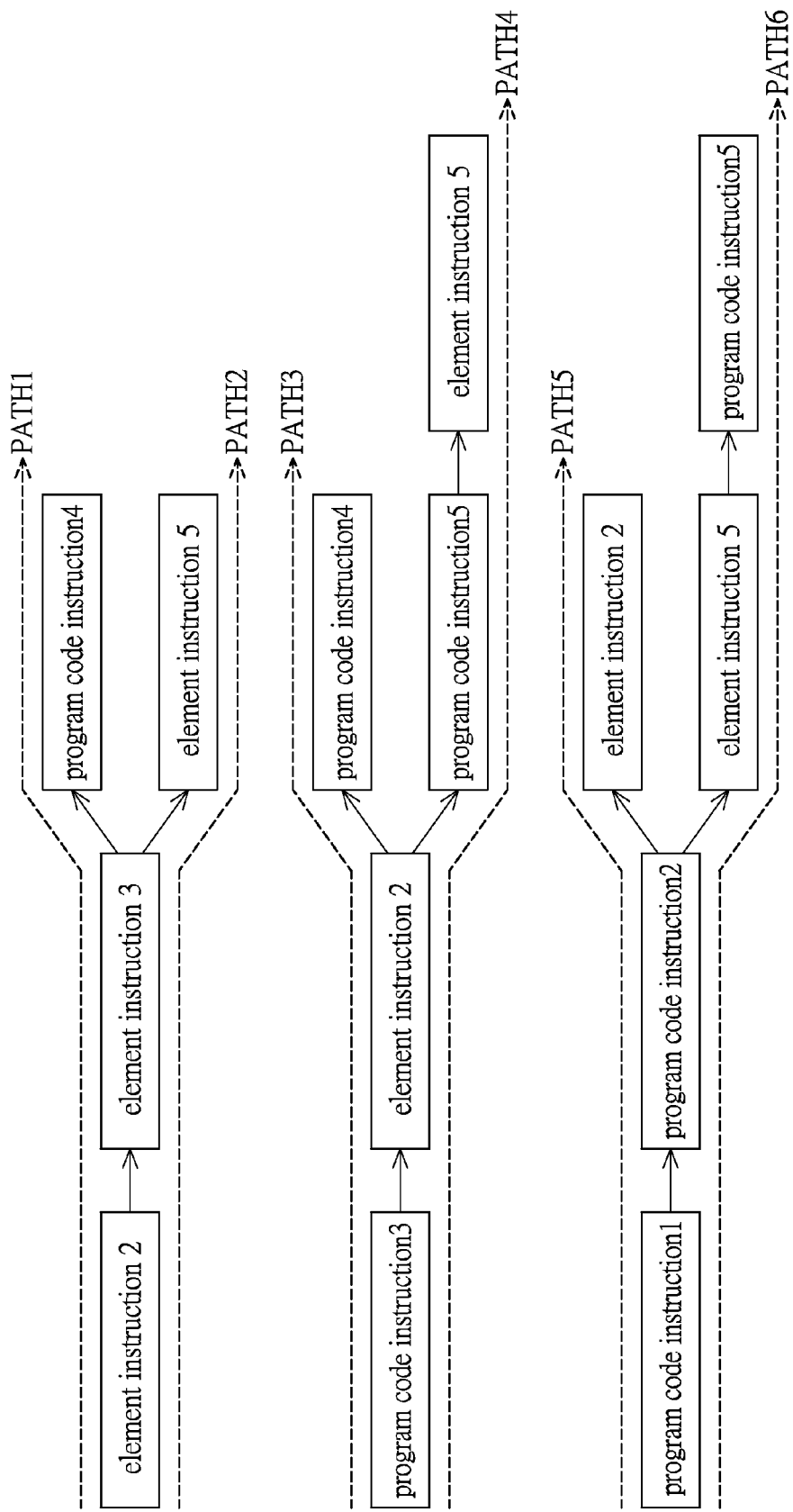
FIG. 4 is a schematic view of multiple compilation paths according to another exemplary embodiment of the present disclosure.

The difference between this embodiment and the above-mentioned embodiment is in that each compilation path has at least one element instruction, at least one program code instruction or combination thereof in this embodiment, and the all instructions in the same compilation path, which includes at least one element instruction, at least one program code instruction, or their combination, has association with each other. For example, as shown in FIG. 4, each of the compilation paths PATH1~PATH6 has one of the element instructions, one of the program code instructions, or combination thereof. That is, the compilation path PATH1 has element instructions 2~3 and a program code instruction 4 which have association with each other; the compilation path PATH2 has the element instructions 2~3 and 5 which have association with each other; the compilation path PATH3 has the element instruction 2 and the program code instructions 3~4 which have association with each other; the compilation path PATH4 has the element instructions 2 and 5 and the program code instructions 3 and 5 which have association with each other; the compilation path PATH5 has the element instruction 2 and the program code instructions 1~2 which have association with each other; and the compilation path PATH6 has the element instruction 5 and the program code instructions 1~2 and 5 which have association with each other.

Next, in step S340, the computing processing unit 120 further predicts the risk level and the test time of each compilation path which has the vulnerabilities or the malicious behaviors according to risk data of the element instruction and risk data of the program code instruction, to classify the compilation paths as the multiple test items correspondingly. In this exemplary embodiment, the risk data of the element instruction and the risk data of the program code instruction are stored in the storage unit 130, to correspondingly provide the computing processing unit 120 predicting the risk level and the test time of each compilation path which has the vulnerabilities or the malicious behaviors. The risk data of the element instruction is made according to the Open Web Application Security Project, a NIST security guideline, or the combination thereof. Similarly, the risk data of the program code instruction is also made according to the Open Web Application Security Project, a NIST security guideline, or the combination thereof. In this exemplary embodiment, the risk data of the element instruction comprises a behavior description, a predicted risk value and a predicted execution time for each element instruction, so as to edit an element risk value and an element execution time of the element instruction. The risk data of the program code instruction comprises a behavior description, a predicted risk value and a predicted execution time for each program code instruction, so as to edit a program code risk value and a program code execution time of the program code instruction. The risk data of the element instruction and the risk data of the program code instruction can also be defined by the user, and the present disclosure is not limited thereto.

Please refer to FIG. 4 and table 2A~2B. As shown in table 2A, the risk data of the element instruction has element instructions 1~5. The element instructions 1~5 correspond to different element risk values and different element execution times respectively, and the higher element risk value represents the higher risk level of the corresponding element instruction which has the vulnerabilities or the malicious behaviors.

TABLE 2A

| element instruction | element risk value | element execution eime (minute) |
|---|---|---|
| element instruction 1 | 1 | 1 |
| element instruction 2 | 2 | 2 |
| element instruction 3 | 3 | 3 |
| element instruction 4 | 4 | 4 |
| element instruction 5 | 5 | 5 |

As shown in table 2B, the risk data of the program code instruction has program code instructions 1~5 and the program code execution time. The program code instructions 1~5 correspond to different program code risk values and different program code execution times, and the higher program code risk value represents the higher risk level of the corresponding program code instruction which has the vulnerabilities or the malicious behaviors.

TABLE 2B

| program code instruction | program code risk value | program Code execution time (minute) |
|---|---|---|
| program code instruction 1 | 1 | 1 |
| program code instruction 2 | 2 | 2 |
| program code instruction 3 | 3 | 3 |
| program code instruction 4 | 4 | 4 |
| program code instruction 5 | 5 | 5 |

Therefore, when the element instruction 1 exists in the compilation path, the computing processing unit 120 records the element risk value of the element instruction 1 as 1 and its element execution time as one minute. Similarly, when the program code instruction 5 exists in the compilation path, the computing processing unit 120 records the program code risk value of the program code instruction 5 as 5 and its program code execution time as five minutes. The computing processing unit 120 detects the element instructions 2~5 and the program code instructions 1~4 in the same way, to respectively record the corresponding element risk values, the element execution times, the program code risk values, and the program code execution times.

For explanatory convenience, the computing processing unit 120 utilizes the compilation paths PATH1~PATH6 of the FIG. 4 to record the element risk values, the element execution times, the program code risk values and program code execution times of the element instructions and program code instructions, to correspondingly predict the risk level and the test time of each of the compilation paths PATH1~PATH6 which has the vulnerabilities or the malicious behaviors. Hereon, the element risk value and program code risk value are called by a joint name as "risk value", and the element execution time and the program code execution time are called by a joint name as "execution time".

As shown in FIG. 4, the computing processing unit 120 records 2, 3 and 4 of risk value and two, three and four minutes of the execution time for the compilation path PATH1, respectively. The computing processing unit 120 records 2, 3 and 5 of the risk value and two, three and five minutes of the execution time for the compilation path PATH2, respectively. The computing processing unit 120 records 2, 5 and 1 of the risk value and two, five and one minutes of the execution time for the compilation path PATH3, respectively. The computing processing unit 120 records 2, 5, 5, and 5 of the risk value and two, five, five, and five minutes of the execution time for the compilation path PATH4, respectively. The computing processing unit 120 records 1, 2, and 2 of the risk value and one, two and two minutes of the execution time for the compilation path PATH5, respectively. The computing processing unit 120 records 1, 2, 5 and 5 of the risk value and one, two, five, and five minutes of the execution time for the compilation path PATH6, respectively.

Next, the computing processing unit 120 calculates an average risk value and an average execution time of each compilation path PATH1~PATH6, as shown in table 3.

TABLE 3

| compilation path | average risk value | average execution time (minute) |
|---|---|---|
| PATH1 | (2 + 3 + 4)/3 = 3 | (2 + 3 + 4) = 9 |
| PATH2 | (2 + 3 + 5)/3 = 3.3 | (2 + 3 + 5) = 10 |
| PATH3 | (2 + 5 + 1)/3 = 2.7 | (2 + 5 + 1) = 8 |
| PATH4 | (2 + 5 + 5 + 5)/4 = 4.3 | (2 + 5 + 5 + 5) = 17 |

TABLE 3-continued

| compilation path | average risk value | average execution time (minute) |
|---|---|---|
| PATH5 | (1 + 2 + 2)/3 = 1.67 | (1 + 2 + 2) = 5 |
| PATH6 | (1 + 2 + 5 + 5)/4 = 3.3 | (1 + 2 + 5 + 5) = 13 |

Next, the computing processing unit 120 predicts the risk level and the test time of each of the compilation paths PATH1~PATH6 which has vulnerabilities or malicious behaviors, according to the average risk value and average execution time of each of the compilation path PATH1~PATH6. By the way, the computing processing unit 120 can also predict the risk level and the test time of each of the compilation paths PATH1~PATH6 which has vulnerabilities or malicious behaviors according to other calculating manner, such as the weighted average of the element risk value and that of the program code risk value. However, the present disclosure is not limited thereto.

In this exemplary embodiment, if the average risk value is larger than 3, the computing processing unit 120 predicts the corresponding compilation path to be the high risk level. If the average risk value is lower than or equal to 3, the computing processing unit 120 predicts the corresponding compilation path to be the low risk level. The risk level is made according to the Open Web Application Security Project, NIST security guideline, or the combination thereof. The risk data of the element instruction and the risk data of the program code instruction can also be defined by the user, and the present disclosure is not limited thereto.

As shown in table 3, the compilation paths PATH1, PATH3 and PATH5 are predicted as the low risk level by the computing processing unit 120, and their test time are nine, eight and five minutes, respectively. The compilation path PATH2, PATH4 and PATH6 are predicted as the high risk level by the computing processing unit 120, and their test time are ten, seventeen and thirteen minutes, respectively. In this case, the computing processing unit 120 classifies the compilation path PATH1~PATH6 as two test items, that is, a "High" test item and a "Low" test item. The test items can be defined according to the practical condition of the compilation paths PATH1~PATH6. For example, the test items can be classified as a "vulnerabilities" test item such as network risk or personal data risk, and a "malicious behaviors" test item such as the changer system or the virus transmission, but the present disclosure is not limited thereto.

Next, in step 350, the computing processing unit 120 receives a detection command to correspondingly select at least one of the test items and a detectable time. In this exemplary embodiment, the detection command is generated by operating the detection interface of the display unit 110, that is, the user operates the detection interface of the display unit 110 by touch control manner, to enable the detection interface generating the detection command to the computing processing unit 120. The detection command can also be generated by other control device, such as a keyboard electrically connected to the computing processing unit 120, but the present disclosure is not limited thereto. Next, in step S360, the computing processing unit 120 selects corresponding compilation paths according to the selection of the test item of the risk and the detectable time. The computing processing unit 120 further executes multiple instruction paths of the application APP corresponding to the compilation paths. After executing for the detectable time, the computing processing unit 120 generates a detection result indicating whether the application APP has the vulnerabilities or the malicious behaviors, to further notify the user probability that the application APP is a malware.

Following the above example, when the detection command received by the computing processing unit 120 is the "Low" test item and fifteen minutes of the detectable time, the computing processing unit 120 further executes the instruction paths of the application APP corresponding to the compilation paths PT1, PT3 and PT5. The highest test time for the computing processing unit 120 to predict that of the compilation paths PT1, PT3 and PT5 is nine minutes, that is, the computing processing unit 120 executes the "Low" test item, so that the test time for completely estimate whether the application APP has vulnerabilities or malicious behaviors needs nine minutes. Therefore, after executing for nine minutes, the computing processing unit 120 generates a detection result indicating whether the application APP has the vulnerabilities or the malicious behaviors. The computing processing unit 120 does not execute for fifteen minutes to generate the detection result indicating whether the application APP has the vulnerabilities or the malicious behaviors. The detection result is displayed on the detection interface of the display unit 110. The user can further handle the application APP according to the detection result, for example, the user can delete the application APP or open the application APP.

When the detection command received by the computing processing unit 120 is to select the "High" test item and fifteen minutes of the detectable time, the computing processing unit 120 further executes the multiple instruction paths of the application APP corresponding to the compilation paths PT2, PT4 and PT6. The highest test time for the computing processing unit 120 to predict that of the compilation paths PT2, PT4 and PT6 is seventeen minutes, that is, the computing processing unit 120 executes the "High" test item, so that the test time for completely estimate whether the application APP has the vulnerabilities or the malicious behaviors needs seventeen minutes. However, the detectable time is just fifteen minutes. Therefore, after executing for fifteen minutes, the computing processing unit 120 generates the detection result indicating whether the application APP has the vulnerabilities or the malicious behaviors, according to the completely executed instructions paths that include the instruction paths corresponding to the compilation path PT2 and PT6, and not completely executed instruction path that includes the instruction path corresponding to the compilation path PT4. The computing processing unit 120 does not execute for fifteen minutes to generate the detection result indicating whether the application APP has the vulnerabilities or the malicious behaviors. The detection result is displayed on the detection interface of the display unit 110. The user can further handle the application APP according to the detection result, for example, the user can delete the application APP or open the application APP.

In conclusion, the method, the electronic device, and the user interface for on-demand detecting the malware provided in the exemplary embodiment of the present disclosure can predict the risk level and the test time of the received application APP which has the vulnerabilities or the malicious behaviors in advance, and then detect the application APP by the selection of user to estimate the risk level of the application APP which has the vulnerabilities or the malicious behaviors, and generate a detection report correspondingly. Therefore, the method, the electronic device and the user interface provided in the exemplary embodiment of the present disclosure can detect the risk level of the received application which has the vulnerabilities or the malicious behaviors before getting the virus pattern of the variant or new malware.

The user interface on the electronic device 100 for user's operation to detect whether the selected application has the vulnerabilities or the malicious behaviors, will be described in the following paragraph. The user interface is placed on the display unit 110, and has a detection interface 160. The detection interface 160 of the electronic device 100 displays a detection result indicating whether the selected application has vulnerabilities or malicious behaviors. For explanatory convenience, the display unit 110 of this exemplary embodiment is a touch-sensitive display with touch control input function, to further provide user controlling the detection interface 160.

Figure 5A:
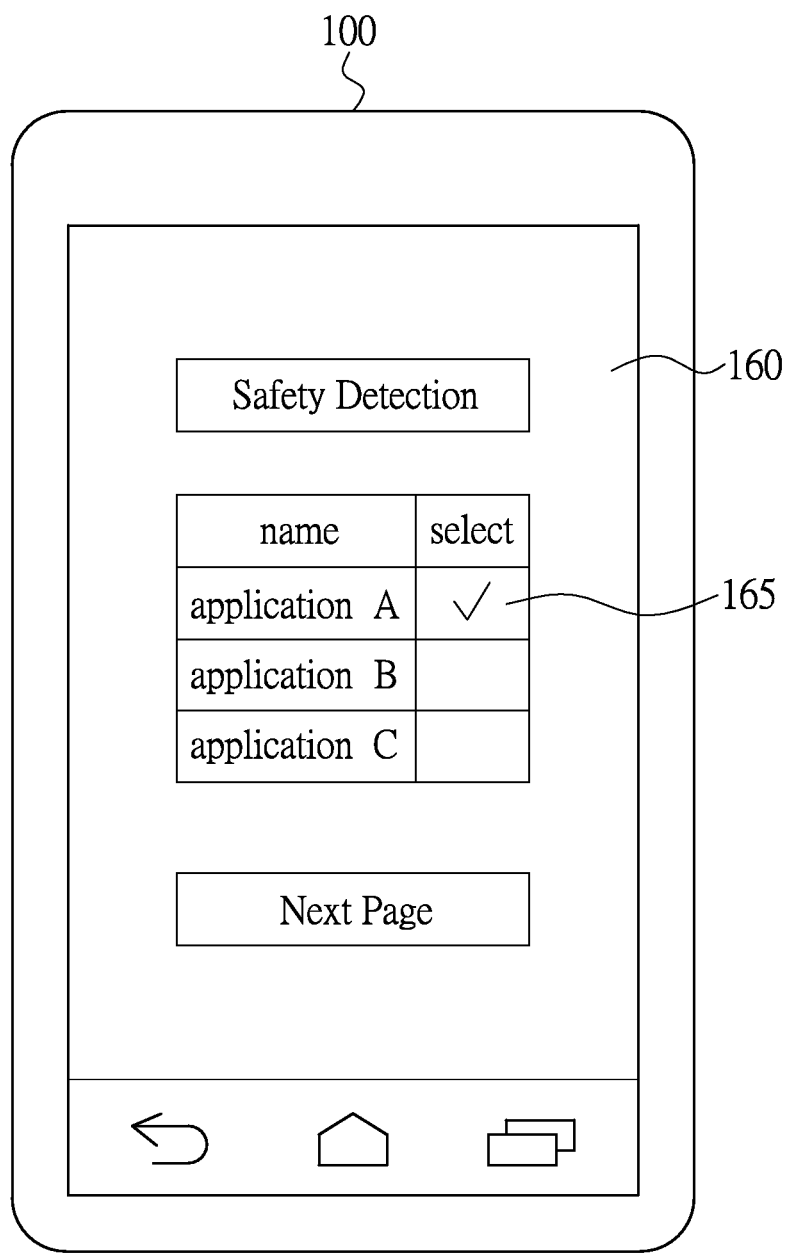
FIG. 5A~5C are schematic views of a detection interface generating a detection result of estimating whether the application has vulnerabilities or malicious behaviors upon user's operation according to another exemplary embodiment of the present disclosure.

As shown in FIG. 5A, when the electronic device 100 receives applications A~C, the detection interface 160 of the display unit 110 displays options for the applications A~C, such as image block 165, to provide the user selecting the application to be detected. After detecting a detection selection, the display unit 110 transmits the application to be detected to the computing processing unit 120 of the electronic device 100. In this exemplary embodiment, the user selects the application A, and it means that the user desires to detect whether the application A has the vulnerabilities or the malicious behaviors.

Next, the computing processing unit 120 predicts the risk level and the test time of the received application A which has the vulnerabilities or the malicious behaviors in advance. When receiving the application A to be detected, the computing processing unit 120 decompiles the application A and generates multiple compilation paths according to an association analysis, to predict multiple paths to be executed by the application A. Finally, the computing processing unit 120 predicts the risk level and the test time of each compilation path of the application A which has the vulnerabilities or the malicious behaviors. The related detail method that the computing processing unit 120 predicts the risk level and the test time of the application A which has vulnerabilities or malicious behaviors is described in steps S210~S240 of the FIG. 2, or the steps S310~S340 of the FIG. 3, so the detail description is omitted. In this exemplary embodiment, the test items are classified as a "Vulnerabilities" test item of the risk which represents vulnerabilities including network risk or personal data risk, and a "Malicious behaviors" test item of the risk which represents malicious behaviors including the changer system or the virus transmission.

Figure 5B:
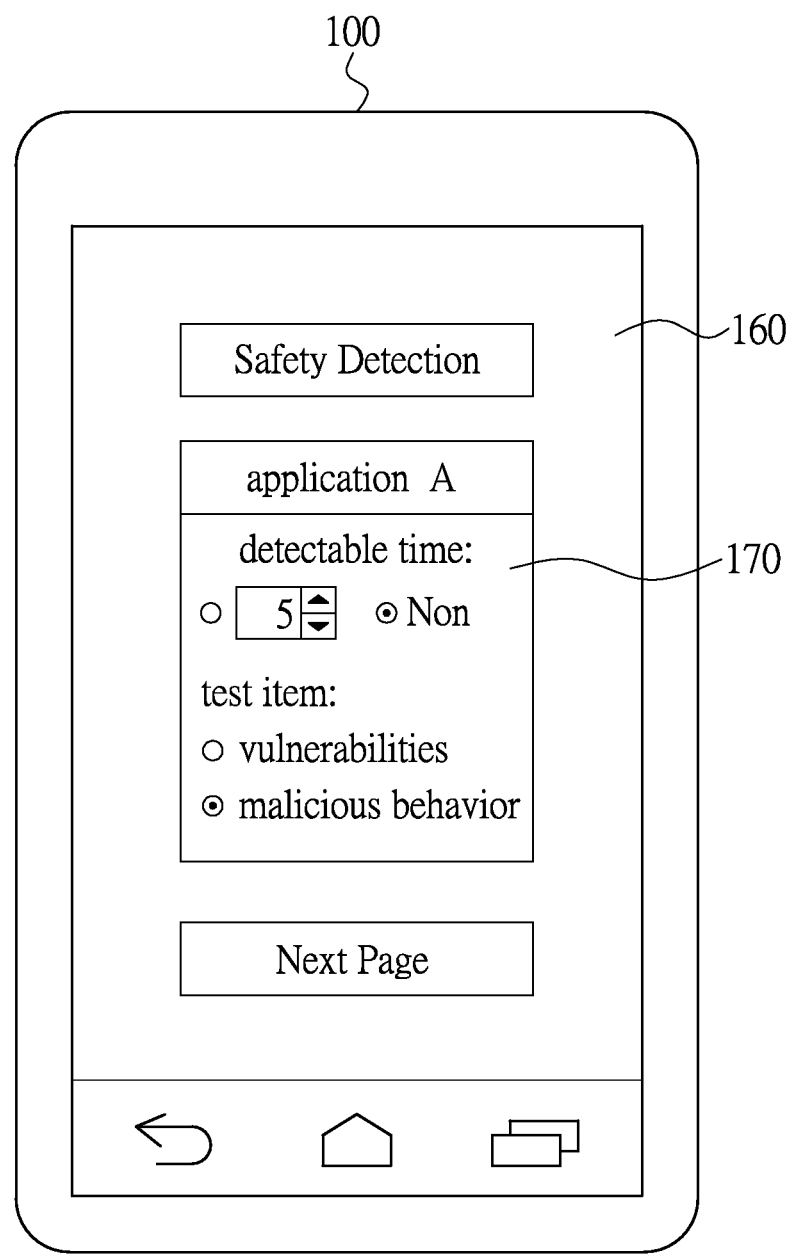

Next, as shown in FIG. 5B, the detection interface 160 displays the test items including the vulnerabilities and the malicious behaviors, and a detectable time such as image block 170, to provide the user selecting the detectable time and test item of the application A to be detected. After detecting a requirement selection, the display unit 110 transmits the detectable time and the test items of the application A to be detected, to the computing processing unit 120 of the electronic device 100. In this exemplary embodiment, the detectable time selected by the user is "Non", and the test item selected by the user is "malicious behaviors". It indicates that the computing processing unit 120 executes "malicious behaviors" test item without time limitation, to completely estimate whether the application APP has vulnerabilities or malicious behaviors.

Figure 5C:
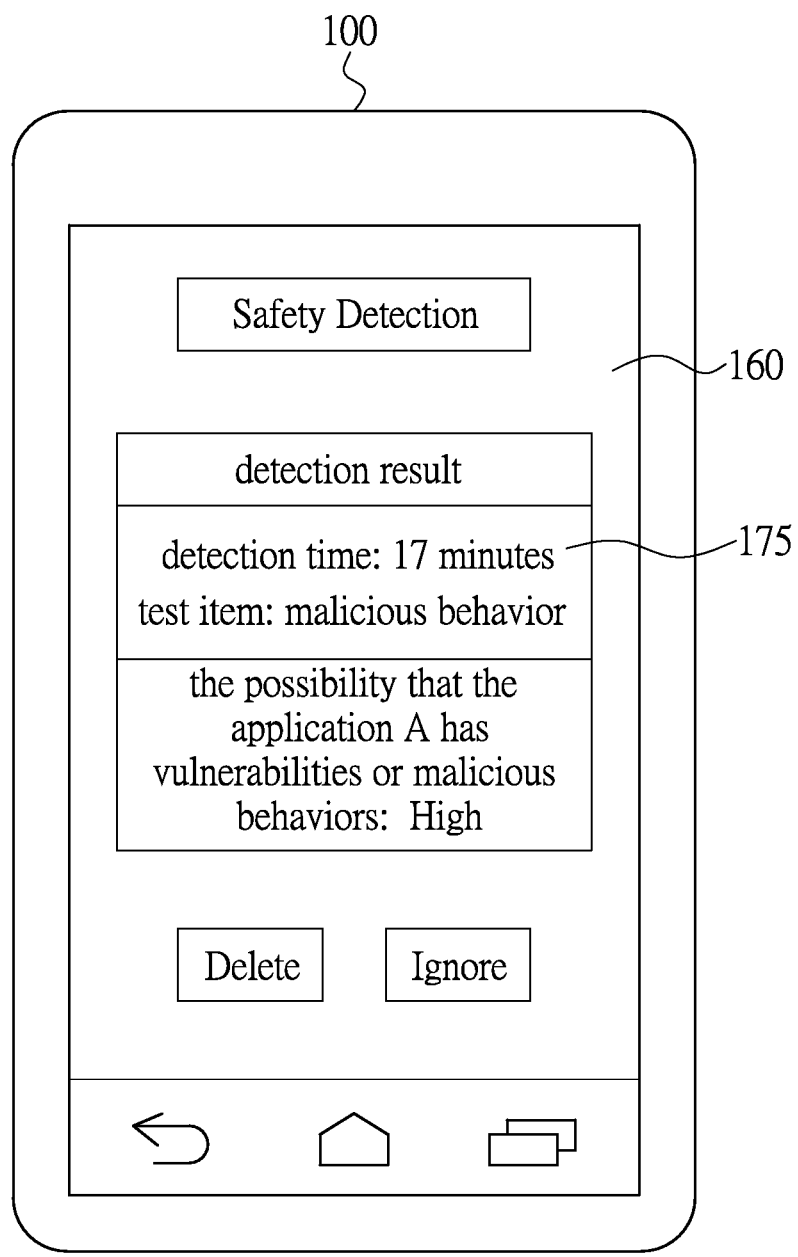

Next, as shown in FIG. 5C, after completely estimating whether the application APP has the vulnerabilities or the malicious behaviors, the computing processing unit 120 generates a detection result indicating whether the application APP has the vulnerabilities or the malicious behaviors, such as image block 175, and displays the detection result on the detection interface 160 of the electronic device 100. In this exemplary embodiment, the possibility that the application A has vulnerabilities or malicious behaviors, shown on the detection interface 160 is "High". In this case, the user can further handle the program A according to the detection result, for example, the user can delete the application A, or ignore the detection result and open the application A.

In addition, the present disclosure also illustrates a non-transitory computer-readable recording medium to store a computer program of the above-mentioned method for on-demand detecting the malware, so as to execute said steps. The non-transitory computer-readable media may be a floppy disk, a hard disk, an optical disc, a flash drive, a tap, a database accessible via the network, or other storage medium which has the same function and is known by the skilled persons in this filed.

In summary, the method, the electronic device, and the user interface for on-demand detecting the malware provided in the exemplary embodiments of the present disclosure can predict the risk level and the test time of received application which has the vulnerabilities or the malicious behaviors in advance, and then detect the application by the selection of user to estimate the risk level of the application which has the vulnerabilities or the malicious behaviors, and generate the detection report correspondingly. Therefore, the method, the electronic device and the user interface provided in the exemplary embodiment of the present disclosure can detect the risk level of the received application which has vulnerabilities or malicious behaviors before getting the virus pattern of the variant or new malware.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for on-demand detecting a malware, adapted for estimating whether an application has vulnerabilities or malicious behaviors, and the method comprising:
receiving the application;
decompiling the application, to generate a compiled code related to the application;
creating multiple compilation paths according to the compiled code and an association analysis, wherein the compilation paths correspond to multiple instruction paths of the application, respectively;
predicting a risk level and a test time of each of the compilation paths which has vulnerabilities or malicious behaviors, and classifying the compilation paths as multiple test items correspondingly;
receiving a detection command, to select at least one of the test items and a detectable time; and
selecting the corresponding compilation paths according to selection of the test items and the detectable time, to execute the instruction paths corresponding to the selected compilation paths, and to generate a detection result indicating whether the application has the vulnerabilities or the malicious behaviors;
wherein each of the compilation paths has at least one element instruction, at least one program code instruction, or combination thereof, and during prediction of the risk level and the test time of each of the compilation paths which has the vulnerabilities or the malicious behaviors, risk data of the element instruction and risk data of the program code instruction are used for prediction to correspondingly generate an element risk value and an element execution time of the element instruction of each of the compilation paths, and to generate a program code risk value and a program code execution time of the program code instruction, so as to predict the risk level and the test time of each of the compilation paths which has the vulnerabilities or the malicious behaviors.

2. The method according to claim 1, wherein the risk data of the element instruction comprises a behavior description, a predicted risk value and a predicted execution time for each of the element instructions, so as to edit the element risk value and the element execution time of the element instruction.

3. The method according to claim 1, wherein the risk data of the program code instruction comprises a behavior description, a predicted risk value and a predicted execution time for each of program code instructions, so as to edit the program code risk value and the program code execution time of the program code instruction.

4. The method according to claim 1, wherein in the step of selecting at least one of the test items and the detectable time, when the detectable time is less than the test time, executing the detectable time for the instruction paths corresponding to the compilation paths, and generating the detection result which estimates whether the application has the vulnerabilities or the malicious behaviors.

5. The method according to claim 1, wherein, before the step of receiving the application, the method further comprises a step of:
creating a detection interface according to at least one application to be detected, to provide a user selecting the application to be detected, and generating the application correspondingly.

6. The method according to claim 1, wherein after the compilation paths are classified as the test items, the method further comprises a step of:
creating a detection interface according to the test items, to provide a user selecting the test item of the risk and the detectable time to be executed, and generating the detection command correspondingly.

7. The method according to claim 1, wherein, before the step of generating the detection result, the method further comprises a step of:
creating a detection interface according to the detection result to display the detection result.

8. The method according to claim 1, wherein the risk level is made according to an Open Web Application Security Project, a NIST security guideline, or the combination thereof when the compilation paths are classified as the test items according to the risk level and the test time.

9. An electronic device for on-demand detecting a malware, adapted for estimating whether an application has vulnerabilities or malicious behaviors, and the electronic device comprising:
a display unit, configured for displaying a detection interface;
a storage unit, configured for storing the application; and
a computing processing unit, configured for executing following steps:
receiving the application by operating the detection interface;
decompiling the application, to generate a compiled code related to the application;
creating multiple compilation paths according to the compiled code and an association analysis, wherein the compilation paths correspond to multiple instruction paths of the application, respectively;
predicting a risk level and a test time of each of the compilation paths which has the vulnerabilities or the malicious behaviors, and classifying the compilation paths as multiple test items correspondingly;
receiving a detection command by operating the detection interface, to select at least one of the test items and a detectable time; and
selecting the corresponding compilation paths according to selection of the test items and the detectable time, to execute the instruction paths corresponding to the selected compilation paths, to generate a detection result indicating whether the application has the vulnerabilities or the malicious behaviors;
wherein each of the compilation paths has one of at least one element instruction and at least one program code instruction, or the combination thereof, and when the computing processing unit predicts the risk level and the test time of each of the compilation paths which has the vulnerabilities or the malicious behaviors, the computing processing unit uses risk data of the element instruction and risk data of the program code instruction for prediction to correspondingly generate an element risk value and an element execution time of the element instruction of each of the compilation paths, and generate a program code risk value and a program code execution time of the program code instruction, so as to predict the risk level and the test time of each of the compilation paths which has vulnerabilities or malicious behaviors.

10. The electronic device according to claim 9, wherein the store unit is configured for storing the risk data of the element instruction and the risk data of the program code instruction.

11. The electronic device according to claim 9, wherein the risk data of the element instruction comprises a behavior description, a predicted risk value and a predicted execution time for each of the element instructions, so as to edit the element risk value and the element execution time of the element instruction.

12. The electronic device according to claim 9, wherein the risk data of the program code instruction comprises a behavior description, a predicted risk value and a predicted execution time for each of program code instructions, so as to edit the program code risk value and the program code execution time of the program code instruction.

13. The electronic device according to claim 9, wherein when the detectable time is less than the test time, the computing processing unit executes the detectable time for the instruction paths corresponding to the compilation paths, and generates the detection result which estimates whether the application has vulnerabilities or malicious behaviors.

14. The electronic device according to claim 9, wherein the risk level is made according to an Open Web Application Security Project, a NIST security guideline, or the combination thereof.

15. The electronic device according to claim 9, wherein the detection interface displays at least one application to be detected, and provides a detecting selection to enable the computing processing unit receiving the application according to the detecting selection.

16. The electronic device according to claim 9, wherein the detection interface displays at least one of the test items and the detectable time of the application, and provides a requirement selection to enable the computing processing unit receiving the detection command according to the requirement selection.

17. The electronic device according to claim 9, wherein the detection interface displays the detection result.

18. A non-transitory computer-readable recording medium, wherein the non-transitory computer-readable recording medium records a computer executable program, and when the non-transitory computer-readable recording medium is accessed by a processor, the processor executes the computer executable program comprising:
- receiving the application;
- decompiling the application, to generate a compiled code related to the application;
- creating multiple compilation paths according to the compiled code and an association analysis, wherein the compilation paths correspond to multiple instruction paths of the application, respectively;
- predicting a risk level and a test time of each of the compilation paths which has vulnerabilities or malicious behaviors, and classifying the compilation paths as multiple test items correspondingly;
- receiving a detection command, to select at least one of the test items and a detectable time; and
- selecting the corresponding compilation paths according to selection of the test items and the detectable time, to execute the instruction paths corresponding to the selected compilation paths, and to generate a detection result indicating whether the application has the vulnerabilities or the malicious behaviors;

wherein each of the compilation paths has at least one element instruction, at least one program code instruction, or combination thereof, and during prediction of the risk level and the test time of each of the compilation paths which has the vulnerabilities or the malicious behaviors, risk data of the element instruction and risk data of the program code instruction are used for prediction to correspondingly generate an element risk value and an element execution time of the element instruction of each of the compilation paths, and to generate a program code risk value and a program code execution time of the program code instruction, so as to predict the risk level and the test time of each of the compilation paths which has the vulnerabilities or the malicious behaviors.

* * * * *